(12) United States Patent
Hatayan

(10) Patent No.: US 10,839,725 B2
(45) Date of Patent: Nov. 17, 2020

(54) ELECTRONIC DISPLAY SYSTEM FOR A CONTAINER

(71) Applicant: Twalib Mbarak Hatayan Limited, Port Louis (MU)

(72) Inventor: Twalib Ali Mbarak Hatayan, Mombasa County (KE)

(73) Assignee: TWALIB MBARAK HATAYAN LIMITED, Port Louis (MU)

( * ) Notice: Subject to any disclaimer, the term of this patent is extended or adjusted under 35 U.S.C. 154(b) by 0 days.

(21) Appl. No.: 16/087,613

(22) PCT Filed: Mar. 23, 2017

(86) PCT No.: PCT/IB2017/051683
§ 371 (c)(1),
(2) Date: Sep. 21, 2018

(87) PCT Pub. No.: WO2017/163209
PCT Pub. Date: Sep. 28, 2017

(65) Prior Publication Data
US 2019/0096296 A1 Mar. 28, 2019

(30) Foreign Application Priority Data
Mar. 23, 2016 (ZA) ................. 2016/02024

(51) Int. Cl.
*G09F 21/04* (2006.01)
*G09F 9/302* (2006.01)
(Continued)

(52) U.S. Cl.
CPC .......... *G09F 21/048* (2013.01); *G06F 3/1446* (2013.01); *G06Q 10/08* (2013.01);
(Continued)

(58) Field of Classification Search
CPC ...... G09F 21/048; G09F 19/12; G09F 9/3026; G09F 9/301; G09F 9/33; G06F 3/1446;
(Continued)

(56) References Cited

U.S. PATENT DOCUMENTS

| 8,947,415 B1 | 2/2015 | Mowry | |
|---|---|---|---|
| 2001/0010745 A1* | 8/2001 | Lowry | ............... G02B 6/06 385/115 |

(Continued)

FOREIGN PATENT DOCUMENTS

| CN | 101034518 A | 9/2007 |
|---|---|---|
| JP | 2010-014553 A | 1/2010 |

(Continued)

*Primary Examiner* — Andrew Sasinowski
(74) *Attorney, Agent, or Firm* — Knobbe, Martens, Olson & Bear LLP

(57) ABSTRACT

An electronic display system for a transport container includes a display surface including a plurality of light emitting panels connected to one another, wherein some of the panels are angled with respect to other panels so that the shape of the display surface is complimentary to the shape of a wall of the container. A memory is used for storing visual content to be displayed on the display surface and a processor is connected to the plurality of light emitting panels to control the output of the light emitting panels to output visual content retrieved from the memory. The system may include a GPS location module connected to the processor which is used to determine the location of the transport container wherein the processor uses the determined location to select which visual content from the memory to display.

6 Claims, 5 Drawing Sheets

(51) Int. Cl.
*G06F 3/14* (2006.01)
*G06Q 30/02* (2012.01)
*G09F 9/33* (2006.01)
*G09F 9/30* (2006.01)
*G09F 19/12* (2006.01)
*G06Q 50/28* (2012.01)
*G06Q 10/08* (2012.01)

(52) U.S. Cl.
CPC ..... *G06Q 30/0251* (2013.01); *G06Q 30/0261* (2013.01); *G06Q 50/28* (2013.01); *G09F 9/301* (2013.01); *G09F 9/3026* (2013.01); *G09F 9/33* (2013.01); *G09F 19/12* (2013.01); *G06Q 10/0831* (2013.01)

(58) Field of Classification Search
CPC .... G06Q 30/0261; G06Q 50/28; G06Q 10/08; G06Q 30/0251; G06Q 10/0831
See application file for complete search history.

(56) References Cited

U.S. PATENT DOCUMENTS

| | | | |
|---|---|---|---|
| 2006/0143957 A1* | 7/2006 | Salehi | G09F 19/18 40/590 |
| 2012/0010745 A1* | 1/2012 | Ide | G05B 19/4163 700/177 |
| 2012/0303458 A1 | 11/2012 | Schuler | |
| 2014/0293017 A1 | 10/2014 | Fei et al. | |
| 2015/0108299 A1 | 4/2015 | Seal | |

FOREIGN PATENT DOCUMENTS

| | | |
|---|---|---|
| JP | 2012-129013 A | 5/2012 |
| JP | 2013-254820 A | 12/2013 |
| JP | 2016-018198 A | 2/2016 |
| WO | WO 2007/091333 A1 | 8/2007 |

\* cited by examiner

ELECTRONIC DISPLAY SYSTEM FOR A CONTAINER

BACKGROUND OF THE INVENTION

The present application relates to an electronic display system for a transport container.

Typical transport containers that are used to transport goods from place to place are large and rectangular in shape and used as shipping containers.

Because of the size and visibility of these containers, they would make good advertising surfaces.

The present invention addresses this and provides an electronic display system for a transport container.

SUMMARY OF THE INVENTION

According to a first example embodiment of the present invention there is provided an electronic display system for a transport container, the display including:
- a display surface including a plurality of light emitting panels connected to one another, wherein some of the panels are angled with respect to other panels so that the shape of the display surface is complimentary to the shape of a wall of the container;
- a memory for storing visual content to be displayed on the display surface; and
- a processor connected to the plurality of light emitting panels to control the output of the light emitting panels to output visual content retrieved from the memory.

The system may further include a communication module for receiving data containing visual content transmitted to the system.

The communication module may be a GPRS communication module.

The system may also include a location module connected to the processor, the location module used to determine the location of the transport container.

The location module may be a GPS module.

In one example, the processor uses the determined location to select which visual content from the memory to display.

DETAILED DESCRIPTION OF THE PREFERRED EMBODIMENT

Referring to the accompanying Figures, an electronic display system for a transport container is provided.

Figure 1:
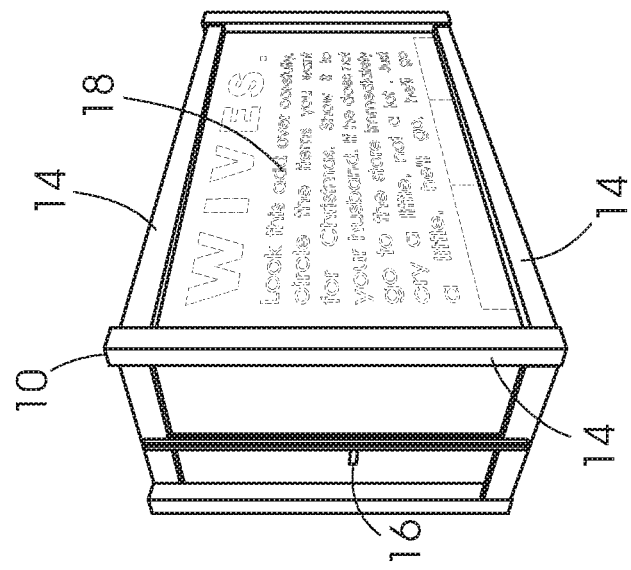
FIG. 1 show examples of transport containers with electronic display systems attached to a side of the containers, according to the present invention.
Figure 1:
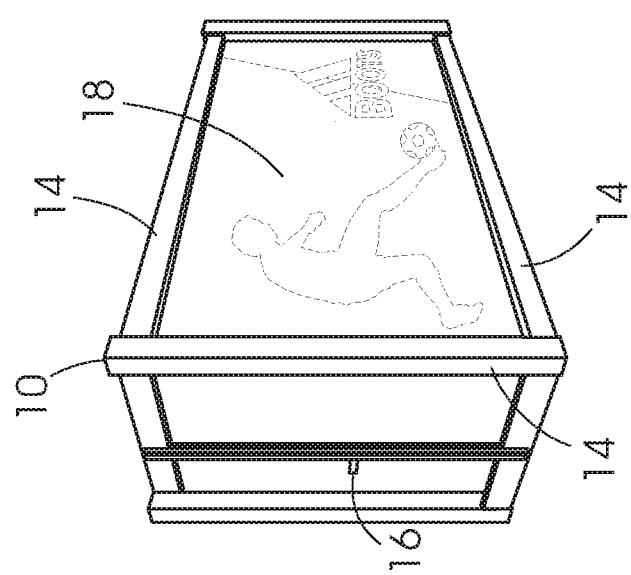
Figure 1:
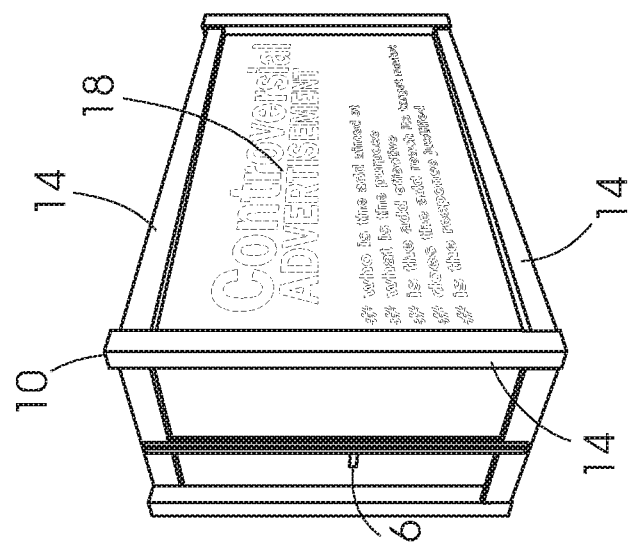

An example of a container 10 as shown in FIG. 1 is a so-called transport container otherwise commonly referred to as a shipping container. In use these transport containers are typically moved between trucks, ships and storage where they are loaded and unloaded.

Thus the term "transport container" used in this specification is to be construed broadly and is not limited to the exemplary description below.

In any event, the container 10 includes a plurality of side walls 14 four in the illustrated embodiment.

A door 16 is typically included in at least one of the side walls 14 through which the inside of the container 10 can be accessed to insert and remove goods from the container.

The container may also include a roof 18 although some containers are open top for abnormal loads.

In use, the door 16 is opened and goods that are to be transported are loaded into the container and the door 16 is then closed and typically locked.

The container 10 is transported to its destination where the container is opened and the goods are accessed.

Before, during and after transport, the containers 10 are visible to a large number of people and so would provide a platform for advertising.

However, it will be appreciated that simply painting an advert onto the side of the container is time consuming and means that the advert will be unchanged even when the container is moved to a different country where the advert may no longer be relevant.

According to a first example embodiment of the present invention an electronic display system 18 for the transport container 10 is provided.

A display surface 20 includes a plurality of light emitting panels 22 connected to one another.

Figure 2:
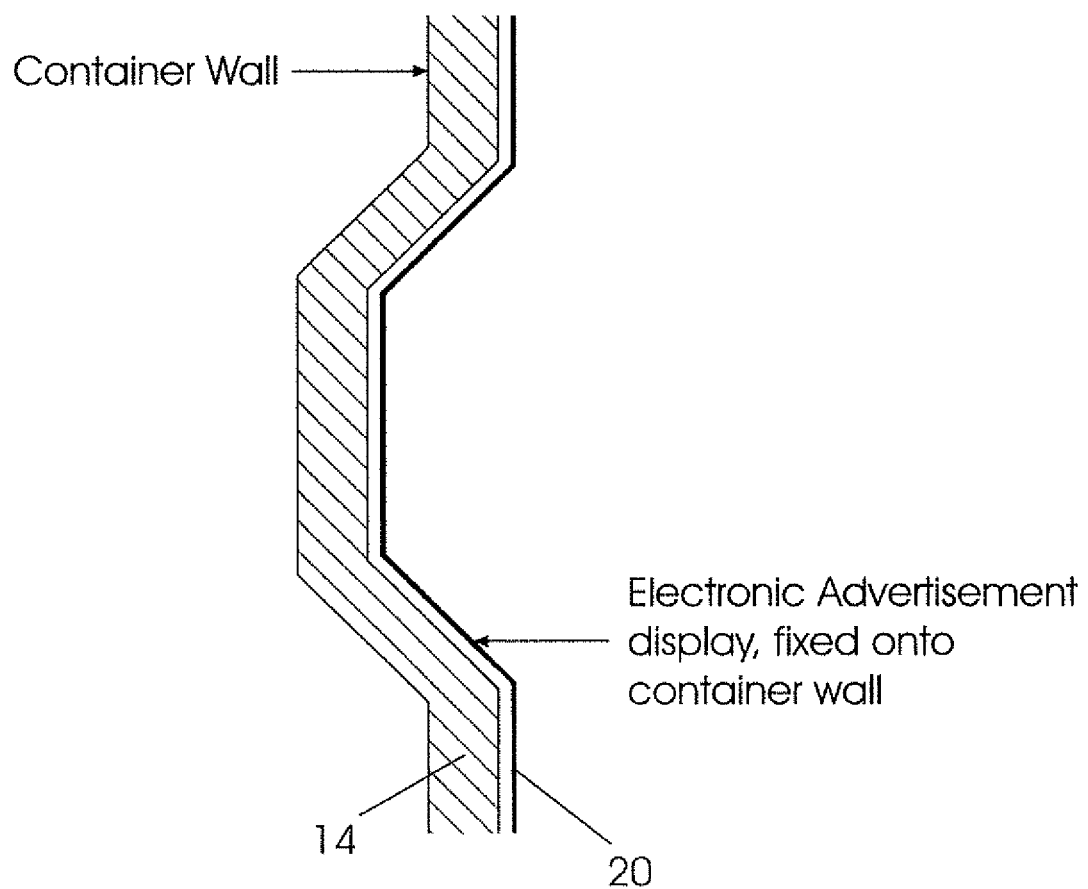
FIG. 2 shows a portion of a container wall illustrating how the shape of the display surface is complimentary to the shape of a wall of the container.
Figure 3:
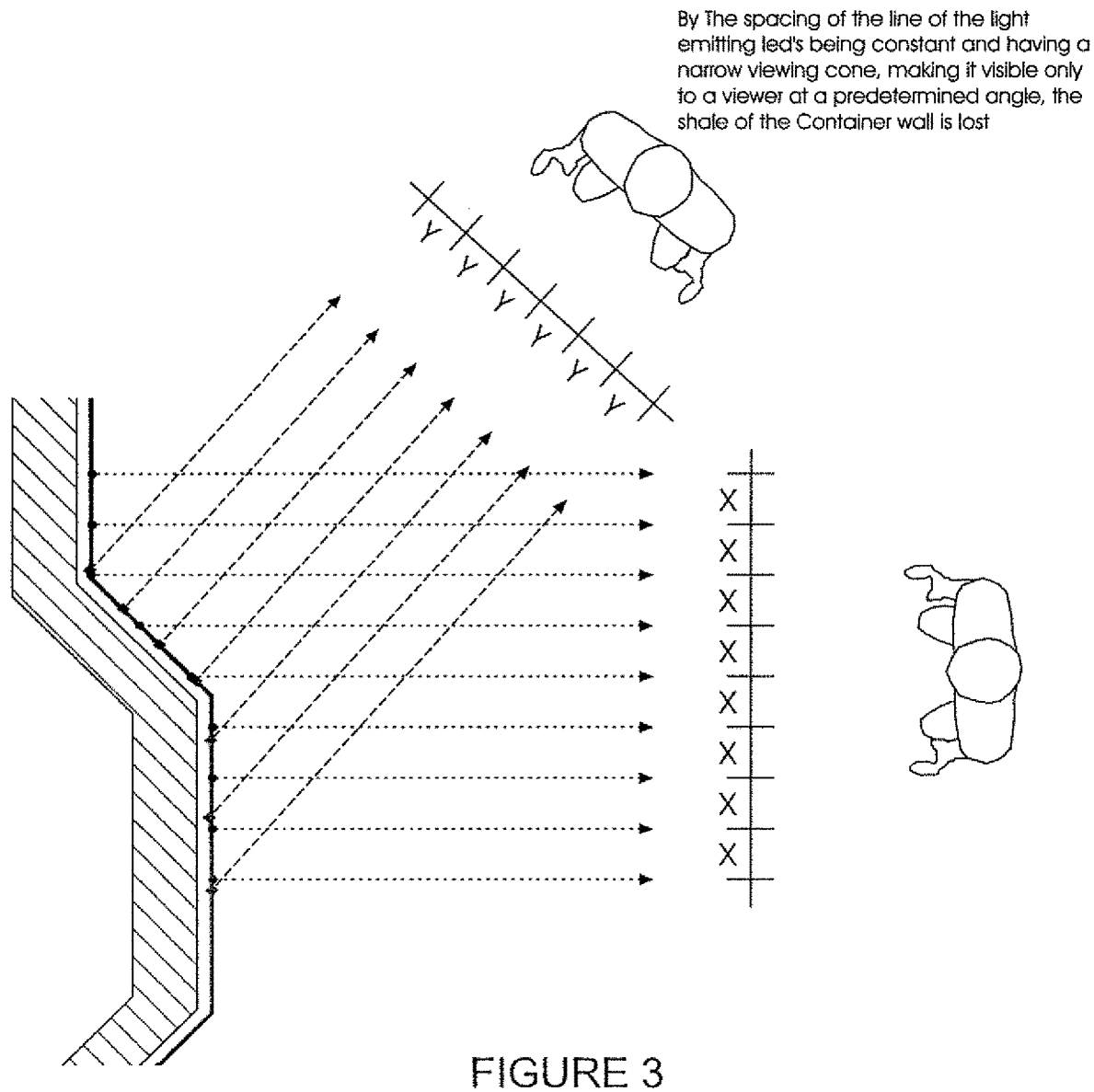
FIG. 3 shows a viewer viewing the portion of the display surface of FIG. 2.

As can best be seen in FIGS. 2 and 3, some of the panels are angled with respect to other panels so that the shape of the display surface is complimentary to the shape of the wall 14 of the container.

In one example embodiment, each of the light emitting panels have located thereon a plurality of light emitting diodes LEDs.

The LEDs are typically arranged in one or more vertical lines going from the top of the light limiting panel to the bottom of the light limiting panel.

Referring to FIG. 3, by the spacing of the line of LEDs being constant and having a narrow viewing cone, the display is visible only to a viewer at a predetermined angle and the shape of the container wall is lost.

Thus it will be appreciated that the electronic display is embedded into the wall of the shipping container such that the final product functions as both a wall and display. For the shipping container to retain its initial functionality, the structural support offered by its wall must remain the same if not improved.

In order to manufacture the electronic display panel is laid out on a flexible plastic substrate, such as polyimide, PEEK or transparent conductive polyester.

It is then coated with a layer of transparent material, such as carbon fiber, on one side. This material will have the function of absorbing any external impact that may be impressed on the container wall as containers are moved, placed or stacked. The electronic display should then remain largely unharmed.

The second side of the electronic display is coated with insulating foam or similar material, which is then affixed on the inner surface of the container wall that may be made of a strong impact resistant material such as steel.

The insulating foam has three functions:
1) To provide electrical insulation between the display panel and any electrically conducting part of the container, such as the standard steel wall. This is particularly an issue when shipping containers are pressed against each other hence leaving less allowance between the screen and the steel forming most part of the wall.

2) To provide elevation on depressed parts of the screen. A ridged wall is much stronger than a straight one. As such the ridged shape is retained in the internal part of the container. A ridged screen however, provides a subtle difference in user experience depending on their viewing angles. As an example, viewing the screen at 15 degrees, the viewer would miss parts of the objects being shown as compared to when viewing the screen at 90 degrees. To solve this, the foam would be deposited in larger quantities on the grooves on the wall to fill it up to tolerable levels for good viewing.

3) To provide cushioning from internal impact. When the container is carrying goods that are not fastened onto the provided hooks, the goods may shift and cause an impact on the wall. Since the inside of the wall is formed from a strong rigid material such as steel, it would provide initial impact resistance. The foam would then provide additional cushioning to the electronic display. It becomes very useful when the rigid inner wall surface, such as steel, transfers the impact.

It is expected that once this wall is installed onto a shipping container, the overall weight should remain within standard specifications. The shape and dimensions of the shipping container are also expected to remain the same for the new shipping container to remain compliant with international shipping standards. This will be achieved by using suitably selected material such a carbon fiber, thin and lightweight yet very strong.

Figure 4:
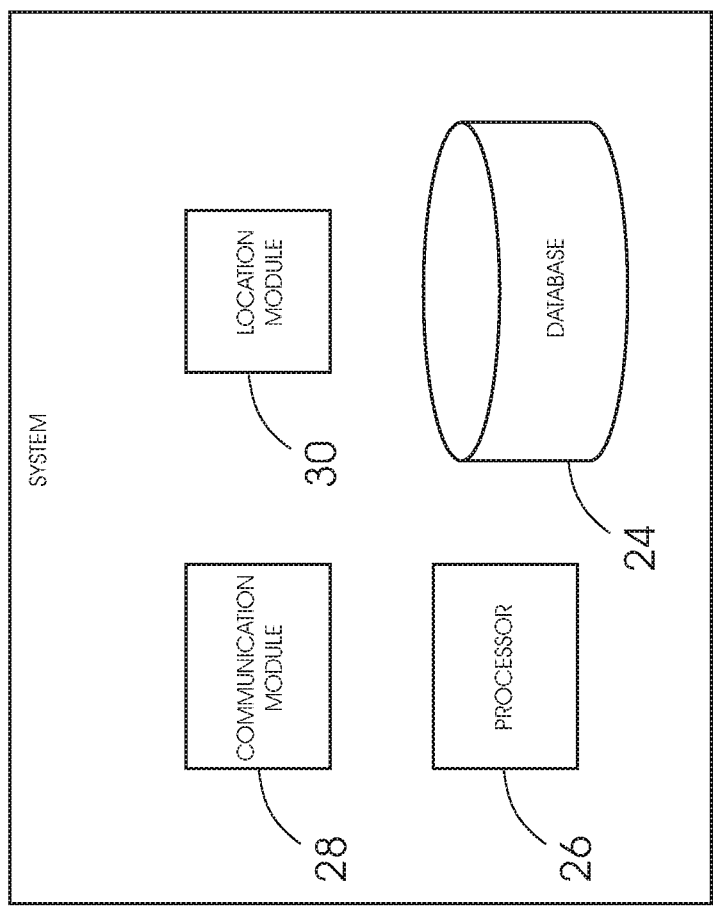
FIG. 4 shows an example block diagram of an electronic display system according to the present invention.

Referring to FIG. 4, a memory 24 is used for storing visual content to be displayed on the display surface and a processor 26 is connected to the plurality of light emitting panels 22 to control the output of the light emitting panels to output visual content retrieved from the memory.

The system may further include a communication module 28 for receiving data containing visual content transmitted to the system.

The communication module 28 may be a GPRS communication module,

The system also includes a location module 30 connected to the processor 26. In one example embodiment, the location module is a GPS module.

In any event, the location module 30 is used to determine the location of the transport container 10 and the processor 26 uses the determined location to select which visual content from the memory to display.

In this manner, the processor 26 can control the system to display adverts relevant to the location in which the container is located. Therefore, for example, if a container was on board a ship and being transported from country A to country B, when the container is located in country a an advertisement can be displayed that is relevant to country A. When the ship arrives in country B the processor determines that the ship is now located in a different country and automatically selects an advertisement that is relevant to country B.

It will be appreciated that due to the corrugated shape of the container is no image processing is done the image will look strange to a viewer.

Therefore, the processor 26 stitches the images together to form the overall image is as follows.

All panels of similar plane are interlinked for image correction from the processor 26.

The processor 26 then corrects the images projected to that of one predetermined plane of view. This is done for all the various planes of the container wall.

The image collected is segmented based on the following parameters:

a) The number of panels—an aim to achieve uniform distribution b) The size of each panel—aims to avoid uneven compression or decompression of images on each panel.

c) Resolution of each panel—in situations where the panels are not of the same resolution, the image must be distributed so an to achieve uniform distribution.

d) The angle of inclination/elevation of each panel—panels that are not straight are allocated to a smaller section of the image and yet the section does through further processing if necessary.

e) Current ambient light level—in an aim to reduce glare that may be caused by the location of a screen panel, panel with direct contact with bright light such as the sun, would have higher contrast and/or be brighter to counteract the effects.

In one example embodiment, each panel as a controller associated therewith which is in communication with the main processor 26.

Figure 5:
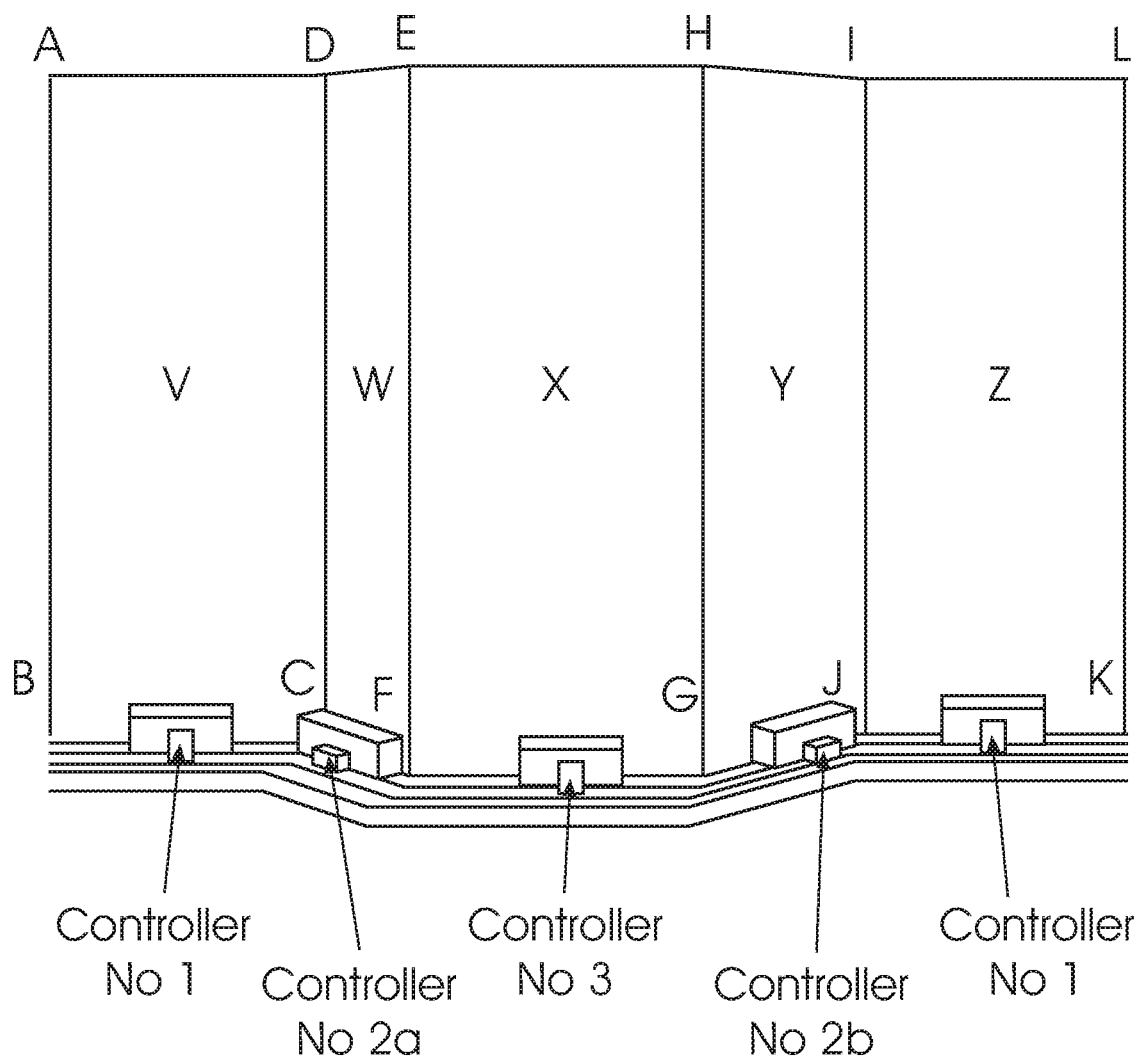
FIG. 5 shows an example of controllers controlling an plurality of panels as depicted.

Thus for example, referring to FIG. 5, if there are panels V, W, X, Y and Z where panels V, X and Z are parallel to the container and one another and panels W and Y are angled slightly with respect to the other panels then the following correction would be applied to make the image look flat:

$V = AB \times AD = DC \times CB$ $W = DC \times DE = [EF \times \delta] \times FC$ where $\delta$ is a perspective correction factor $X = EF \times EH = HG \times GF$ $Y = [HG \times \infty] \times HI = IJ \times JG$ where $\infty$ is a perspective correction factor $Z = IJ \times JK = KL \times LI$ TOTAL DISPLAY $= V + W + [X \times \delta] + Y + Z$ where $\delta$ is a perspective correction factor Where V, W, X, Y & Z are the images displayed on the respective panels.

Where image V and Z are on controller No. 1

Where image W is on controller No. 2a

Where image Y is on controller No. 2b

Where image X is on controller No. 3

Where controller No. 1 sews the image V & W at edge DC, and image Y & Z at edge IJ Where controller No. 2a sews the image W & X at edge EF Where controller No. 2b sews the image X & Y at edge HG Where controller No. 3 sews the image W & X at edge EF, and image X & Y at edge HG Where controllers No. 1, No. 2a, No. 2b and No. 3 are controlled by processor 26.

Thus it will be appreciated that the processor 26 corrects the images from the light emitting panels so that an overall image viewed is corrected despite the panels being angled with respect to one another.

What is claimed is:

1. An electronic display system for a transport container, the system comprising:
    a display surface including a plurality of light emitting panels connected to one another, wherein some of the panels are angled with respect to other panels so that the shape of the display surface is complimentary to the shape of a wall of the container;

a memory for storing visual content to be displayed on the display surface;

a processor connected to the plurality of light emitting panels to control the output of the light emitting panels to output visual content retrieved from the memory; and a location module connected to the processor, wherein the location module is configured to determine a location of the transport container, and wherein the processor is configured to use the determined location of the transport container to select which visual content from the memory to display on the display surface, wherein one side of the display surface is coated with a layer of transparent material to absorb any external impact that is impressed on the wall of the transport container, and wherein the other side of the display surface is coated with an insulating foam which is affixed on the wall of the transport container.

2. The system according to claim 1, further comprising a communication module for receiving data containing visual content transmitted to the system.

3. The system according to claim 2, wherein the communication module is a GPRS communication module.

4. The system according to claim 1, wherein the location module is a GPS module.

5. The system according to claim 1, wherein the processor corrects the images from the light emitting panels so that an overall image viewed is corrected despite the panels being angled with respect to one another.

6. The system according to claim 1, wherein the transparent material is a carbon fiber.

* * * * *